T. E. CROSBY.
BATH TRAP.
APPLICATION FILED MAR. 8, 1909.
1,011,035.
Patented Dec. 5, 1911.
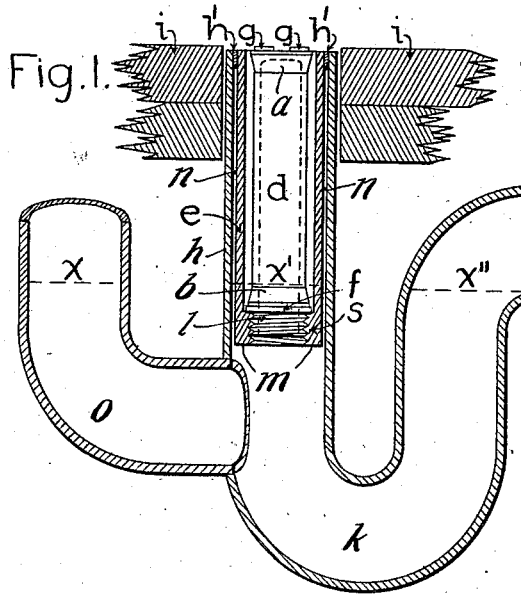
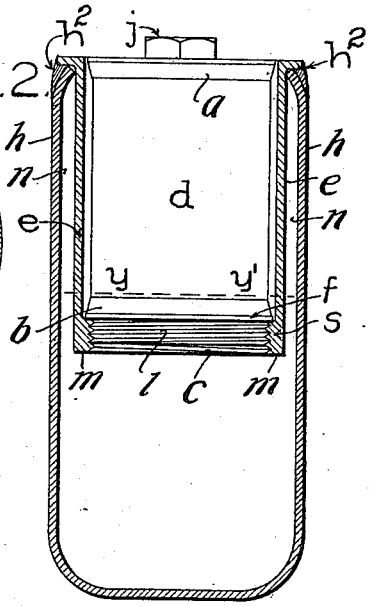
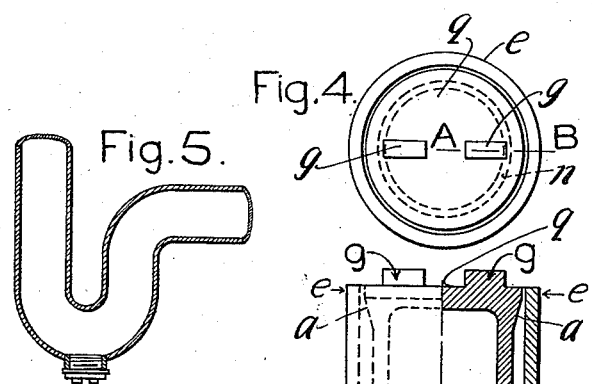
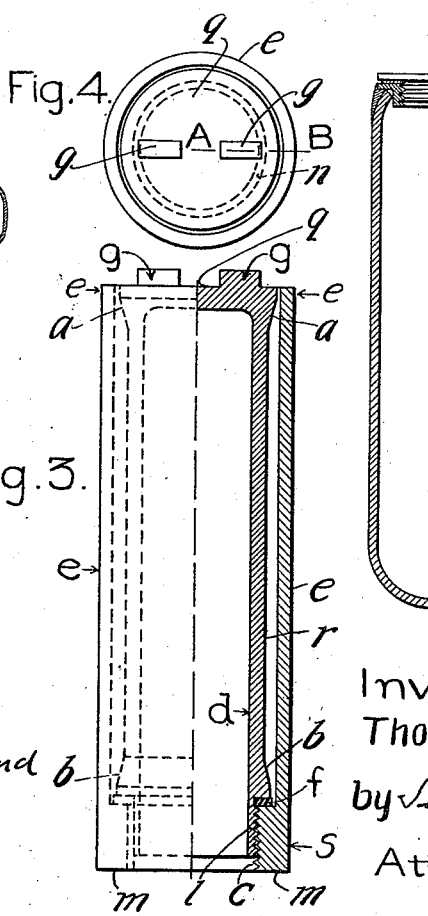
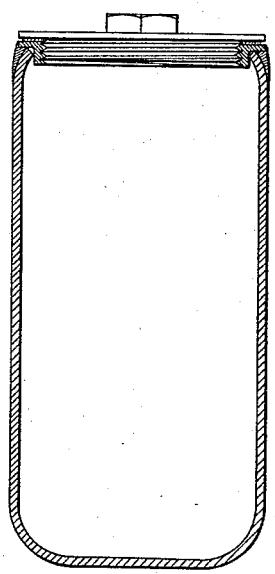
Inventor
Thomas E. Crosby
by Smith & Brisbee
Attorneys
Witnesses
Ethel M. Potter
Robert W. Howard

UNITED STATES PATENT OFFICE.

THOMAS E. CROSBY, OF BOSTON, MASSACHUSETTS.

BATH-TRAP.

1,011,035. Specification of Letters Patent. Patented Dec. 5, 1911.

Application filed March 8, 1909. Serial No. 482,190.

*To all whom it may concern:*

Be it known that I, THOMAS E. CROSBY, a citizen of the United States, residing at Boston, in the county of Suffolk and State of Massachusetts, have invented certain new and useful Improvements in Bath-Traps, of which the following is a specification, reference being had therein to the accompanying drawing.

My invention relates to improvements in bath traps such as are generally used in connection with plumbing fixtures, which is simple in construction and in which improved means is provided for submerging the trap screw and for intercepting and collecting grease.

The invention relates more particularly to traps used in connection with bath tubs, wash-basins and sinks, but may be used in connection with any water fixtures.

The object of the invention is to provide a trap which has superior advantages in its simplicity, durability and general efficiency, and which is so constructed that it is readily accessible for cleaning, and in which the trap-screw is entirely submerged under water, thus forming an under-water seal to prevent siphonage.

Another object is to provide a receptacle to intercept grease from the water and collect it in such a manner that the grease can be easily removed by unscrewing the trap screw and without removing any other part of the trap.

Another object is to provide a trap having means for ready access from above the floor for cleaning without removing the floor, and adapted to be easily plunged in cleaning or in case of stoppage, without using any wires or rods, as are generally used for the purpose with ordinary traps.

Another object is to provide a trap that has means for retarding the flow of water and thereby preventing siphonage.

Another object is to provide a trap that not only prevents grease from collecting near the portion of the trap adjoining the floor, but also is entirely sealed under water, so that there is no possibility of the escape of obnoxious gases or odors.

Another object is to provide a trap that permits the inlet-pipe and branch pipes to be put in between floor timbers at an angle without the necessity of cutting openings in the timbers for them, as is necessary when ordinary traps are used.

Another object is to provide a trap in which the outlet-pipe leads from the trap at a point below the plane of the inlet-pipe.

Another object is to provide an air space between the outer wall of the receptacle and the casing of the trap and between the base and the top of the receptacle which serves to make a deeper seal and to prevent siphonage.

The invention consists in the combination of elements and in certain parts of novel construction included therein, in order to obtain the desired result.

A full understanding of my invention can best be given by a detailed description of a preferred construction embodying the various features of my invention, and such a description will now be given in connection with the accompanying drawings, and I attain my object by the mechanism there illustrated, showing such preferred construction, and the features forming the invention will then be specifically pointed out in the claims.

In the accompanying drawings, Figure 1 is a central vertical section of my improved bath trap in the form of an S-shaped trap. Fig. 2 is a central vertical section of the bath trap in the form of a round trap. Fig. 3 is an elevation on the line A—B, Fig. 4, partly in section, of the bath trap. Fig. 4 is a plan view of my improved bath trap. Fig. 5 is a central section of an S-shaped trap showing a trap screw in general use in its base. Fig. 6 is a central section of a round trap showing a trap screw generally used in this form of trap.

Latitude is allowed herein as to details, since they may be varied or changed at will without departing from the spirit of my invention and the same will nevertheless remain intact and be protected.

Corresponding and like parts are referred to in the following description and indicated in all the figures of the drawings by the same reference characters.

In the drawings $d$ is an inverted receptacle closed at its upper end, attached below the floor $i$, which serves to collect grease passing through the trap $k$.

The receptacle $d$ has a cap portion $q$ and a casing $r$ depending therefrom and is provided with an outer casing $e$, which is provided in its base with a threaded opening $c$, and the whole is inserted in the trap $k$. The casing of the receptacle $d$ has a tapered upper portion $a$ and a tapered lower portion $b$ and an intervening, recessed outer surface. The tapered upper and lower portions of the casing $r$ and the intervening recessed outer surface of the casing $r$ permit the receptacle $d$ to be easily inserted in the outer casing $e$ and removed therefrom without contact between the casing $r$ and the outer casing $e$. The lower portion $b$ of the casing $r$ is provided with a trap screw or threaded portion $l$ adapted to engage a threaded opening $c$ in the base $s$ of the outer casing $e$. On the upper surface of the cap-portion $q$ the receptacle $d$ is provided with lugs or ground keys $g$, for use in applying a tool in opening and closing the trap screw. The base of the outer casing $e$ has square shoulders $m$ which serve to retard the flow of water and thereby prevent siphonage. An air space $n$ between the outer casing $e$ and the wall $h$ of the trap $k$ aids in preventing siphonage.

A washer $f$ of leather or other suitable material encircles the threaded portion $l$ between the tapered portion $b$ and the base of the outer casing $e$, so as to make an airtight joint and prevent any leakage or escape of obnoxious gases.

An inlet-pipe $o$ is placed preferably below the seal, and an outlet pipe $p$ leads from the trap $k$, an arrangement which permits the inlet-pipe and outlet-pipe to be placed at any angle between floor timbers, so as to avoid cutting openings in the timbers for these pipes. The receptacle is readily attached to the casing $h$ of the trap $k$ by a soldered joint $h^1$ or as shown in Fig. 2 by a soldered flange $h^2$. In Fig. 1 the trap screw is shown in its proper position entirely submerged under water, the level of which is indicated at $x$, $x^1$ and $x^{11}$. In Fig. 2 a modified form of lug $j$ is shown.

In operation the receptacle is placed in position in the trap as shown in Fig. 1 and Fig. 2 and grease passing through the inlet-pipe $o$ floats upward and solidifies within the receptacle $d$. The trap screw being entirely submerged forms a perfect underwater seal and prevents the escape of any gases, while the air tight joint aids in preventing any gases from escaping or any leakage of grease or water. Moreover, the shoulders $m$ together with the air space $n$ and the air space between the base and the top of the receptacle prevent the breaking of the seal by siphonage. When it is desired to remove the receptacle the trap screw $l$ is unfastened and the receptacle may be readily removed and the grease easily taken out without taking up the floor or disturbing the trap in any way, and the grease receptacle is so constructed that there is no necessity of using a pan or other receptacle under the trap for leakage, as is usually necessary when opening traps in general use. After cleaning the grease receptacle may be easily replaced and fastened in the base of the casing. It is obvious that by reason of the depth of the trap screw and seal under water, in connection with the shoulders $m$ and air spaces, which act as retarding means, it is difficult to break the seal by siphonage.

It is to be understood that my invention is not limited to the specific details of construction shown in the accompanying drawings, but that said details may be varied in the practical carrying out of my invention.

It is also to be understood that the combinations specifically set forth in the several claims are intended to be separately claimed without limitation to the use in connection therewith of other features and details of construction illustrated.

I claim as new and desire to secure by Letters Patent:—

1. In a bath trap, an inlet-pipe, an outlet-pipe, an outer-casing, an inner-casing fixedly attached to the said outer-casing and extending downwardly into the trap to a point above the inlet-pipe, an annular base portion on the lower end of the said inner-casing extending inwardly and having an upper inner-surface and a threaded opening, a tubular member within the said inner-casing having an expanded, closed upper end extending out to the said inner-casing, an expanded lower end, an intermediate, recessed wall between the said expanded ends and out of contact with the said inner-casing, a threaded portion extending below the said expanded lower end of the tubular member, the said expanded lower end extending laterally from the said threaded portion out to the inner-casing and having a lower-surface adapted to coöperate with the said inner-surface of the annular base portion of the inner-casing.

2. In a bath trap, an inlet-pipe, an inner-casing fixedly attached at its upper end to the top of the casing of the trap and provided with an annular base portion having an inner threaded portion, the said inner-casing extending downwardly into the trap to a point above the inlet-pipe, a tubular member, closed by a cap-portion at its upper end, within the said inner-casing and provided with a threaded outer portion on its lower end, an enlarged outwardly inclined portion at the upper end of the said tubular member, and an enlarged outwardly inclined portion having a flat annular portion at its extremity above and adjacent to the said threaded portion on the lower end of the said tubular member and of greater diameter than the said threaded portion, the said flat annular portion being adapted to coöperate with the said annular base portion of the inner-casing.

3. In a bath trap, an inlet-pipe, an inner-casing fixedly attached at its upper end to the top of the casing of the trap and provided with an annular base portion having an inner threaded portion, and a tubular member, closed by a cap-portion at its upper end, within the said inner-casing, the said tubular member having an enlarged outwardly inclined portion at its upper end, a threaded outer portion on its lower end and an enlarged outwardly inclined portion immediately above and adjacent to the said threaded portion having a flat annular portion at its extremity of greater diameter than the said threaded portion.

In testimony whereof I affix my signature in presence of two witnesses.

THOMAS E. CROSBY.

Witnesses:
CHARLES F. A. SMITH,
ETHEL M. POTTER.

Copies of this patent may be obtained for five cents each, by addressing the "Commissioner of Patents, Washington, D. C."